United States Patent [19]

Leuchtmann

[11] Patent Number: 5,669,668
[45] Date of Patent: Sep. 23, 1997

[54] FOLDING HEADREST IN PARTICULAR FOR MOTOR VEHICLES

[75] Inventor: Andrew Leuchtmann, Bad Kreuznach, Germany

[73] Assignee: General Motors Corporation, Detroit, Mich.

[21] Appl. No.: 693,819

[22] Filed: Jul. 26, 1996

[30] Foreign Application Priority Data

Aug. 3, 1995 [DE] Germany ............ 195 28 456.9

[51] Int. Cl.⁶ .......................... A47C 7/36; B60N 2/48
[52] U.S. Cl. ........................ 297/408; 297/403; 403/325
[58] Field of Search ........................ 297/403, 408, 297/391; 403/321, 322, 102, 325

[56] References Cited

U.S. PATENT DOCUMENTS

| | | | |
|---|---|---|---|
| 3,174,799 | 3/1965 | Hatenberger | 297/403 |
| 3,304,120 | 2/1967 | Cramer | 297/403 |
| 3,547,486 | 12/1970 | Heizer | 297/408 |
| 4,711,494 | 12/1987 | Duvenkamp | 297/403 |
| 4,762,367 | 8/1988 | Denton | 297/409 |
| 4,943,182 | 7/1990 | Hoblingre | 403/325 |
| 5,145,233 | 9/1992 | Nagashima | 297/408 |

*Primary Examiner*—Peter M. Cuomo
*Assistant Examiner*—Anthony Barfield
*Attorney, Agent, or Firm*—Patrick M. Griffin; Ernest E. Helms

[57] ABSTRACT

A headrest is provided that can be folded by a pivot mechanism, in particular for a motor vehicle seat having a backrest, which can be attached by posts on the backrest or on a component connected to the car body in the region of the backrest upper edge and can be locked by a locking mechanism at least in an approximately vertical position of use. For simplicity of production and to increase the convenience of using the headrest, the locking device is arranged inside the pivot mechanism which has a sleeve-shaped housing with at least one journal pin rotatably mounted in it and is arranged outside the headrest.

1 Claim, 6 Drawing Sheets

FOLDING HEADREST IN PARTICULAR FOR MOTOR VEHICLES

BACKGROUND OF THE INVENTION

The invention relates to a folding headrest, in particular for a motor vehicle seat having a backrest, with a supporting structure and upholstery enveloping it, in which the headrest can be tilted forward and/or rearward by means of at least one support on the backrest or on a component arranged in the region of the upper edge of the backrest and connected to the car body, can be tilted forward and/or rearward by means of a pivot mechanism about at least one horizontal axis lying in the transverse direction of the motor vehicle and can be locked by means of a locking device at least in the approximately vertical position of use.

A support rod of the above noted headrest is designed with a rotary hinge joint which connects an upper rod segment connected to the headrest and a lower rod segment which can be inserted into a guide sleeve in the backrest. The disadvantage of this design is the fact that in order to lock the headrest in the position of use, the rotary hinge joint and part of the upper rod segment must also be inserted into the guide sleeve. Also in such a design—due to the shape and dimensions of the guide sleeve—the strength of the support rod is substantially reduced in the region of the rotary hinge joint.

Another folding headrest is known in which a cross member designed as a cushion-carrying component of the headrest is rotatably supported on the bearing body of the support rods and is designed so as to lock. In this case, the rotary mounting and the locking device of the cross member is also arranged inside the headrest. In the case of a change in model, changes in the support and locking device, or in the case of repair operations therefore, the entire headrest must be replaced or exchanged.

The present invention has the objective of devising a folding headrest of the type mentioned initially for a motor vehicle which is relatively simple and convenient to operate and can be manufactured safely and economically and can also be mounted in the position of a conventional headrest in the motor vehicle. This problem is solved by the present invention by arranging the pivot mechanism outside the headrest and connecting the headrest to the pivot mechanism, the pivot mechanism having at least one sleeve-shaped housing with at least one journal pin mounted rotatably in it, the housing or the journal pin being connected by at least one other support to the supporting structure of the headrest, and the locking device is arranged inside the housing and in the locked position, the housing is connected to the journal pin.

With this design, individual parts of the headrest, e.g., the cushion with the support structure or the pivot mechanism with the locking device, can be produced and preassembled as separate components of the headrest. In the case of changes, such as in the shape and/or material composition of the cushion parts, only these changed parts have to be exchanged. The pivot mechanism and the locking device can still be used.

The pivot mechanism may have various configurations. According to a preferred version, the supports are attached to the housing on one side and on the other are detachably connected to the backrest or the component connected to the car body. The component connected to the car body, for example, may be a stable cargo space cover which is connected on both sides to the car body. In this design, the journal pin connected to the headrest is held rotatably in the stationary housing. The supports attached to the backrest or the component connected to the car body may also be connected, in another version of the pivot mechanism, to the journal pin which then rotatably supports the housing connected to the headrest.

For a detachable connection of the headrest to the pivot mechanism, supports are also provided which are detachably connected, in each case with one end to the supporting structure of the headrest and with the other end to the housing or to the journal pin. In the previously described version of the pivot mechanism in which the stationary housing holds the journal pin rotatably, these supports are connected to the journal pin. In the alternative version of the pivot mechanism, in which the stationary journal pin holds the housing in a rotatable manner, therefore the supports detachably connected to the supporting structure of the headrest would be firmly connected to the housing.

In order to achieve in this case a rapid attachment of the headrest to the pivot mechanism, both the detachable connection of the supports with the supporting structure, as well as their connection to the journal pin or housing, can be formed by known snap-lock devices.

The detachable attachment of the headrest in the motor vehicle can be produced especially simply and economically if the supports are designed as conventional support posts which can be inserted into sleeve-shaped guides on the headrest and/or the backrest or on the component connected to the car body and attached there. The support posts can thus be attached in a snap-locking manner in the sleeve-like guides. This design makes the simple assembly of the headrest on the motor vehicle seat possible, in which case the conventional height- and tilt-adjustable headrest, if necessary, can be replaced by the folding headrest according to the invention.

According to a preferred version of the invention, it is envisioned that the locking device has a lock arranged inside the housing and capable of being pushed against the force of a spring which is guided in a groove-shaped guide in the journal pin and displays locking lugs or locking edges which engage in a form-fitting manner, a recess in the housing in the locked state or interact with a stop on the housing. The lock in this case is capable of being switched to a released position by activating at least one release knob arranged on the housing or journal pin whereupon the locking lugs or locking edges are disengaged from the recess on the housing. With this design, the headrest can not only be locked in the approximately vertical position of use but also be simply unlocked by the release knob.

In order to increase the comfort when activating the headrest in the motor vehicle in this case, it is envisioned according to the invention that for the automatic switching of the unlocked headrest into the rest position at least one torsion spring, preferably a spring clip be arranged inside the housing which is supported under spring tension on one side on the journal pin and on the other on the housing. The spring is in the tensioned state in the unlocked position of the headrest. Upon activation of the release knob, the headrest is automatically moved by the force of the spring into the rest position; e.g., into a position rotated forward or rearward by 90 degrees. In order to move the headrest into the approximately vertical position of use, conversely, the headrest must be rotated upward against the force of the spring until the locking lug or locking edge engages the recess on the housing.

The guidance of the lock on the journal pin may have various designs. According to a preferred version, the lock may be held inside the housing in the groove-like guide on the journal pin in an axially displaceable manner, in which case at least one guide pin of the lock is inserted without play into a boring on the journal pin. The lock is therefore held secured against rotation against the journal pin by the groove-like guide and is guided precisely in a sliding manner through the journal pin.

The axial guidance of the lock on the journal pin is especially simple in design, if two journal pins are arranged inside the housing which hold the lock in a nonrotatable manner. With this design, the groove-like guides in which the lock engages in a rotationally secure manner with its flattened areas, is of larger dimensions in the axial direction than the lock so that the latter can move between two positions. The guide pins arranged on both side of the lock in this case are held in a sliding manner in borings in the journal pin so that in the locked position, the spring arranged on one guide pin presses the lock against a groove base on the opposite journal pin. In order to lock the housing with respect to the journal pin, a wall with an axial boring is provided on the housing, preferably approximately in the central region, said wall displaying at least one recess between the boring and the jacket of the housing for the insertion of the lock or its locking lug or edge when the headrest is to be locked. In the locked position, therefore, the locking lug or edge arranged on the lock approximately in the central region between the journal pins is spring-tensioned in the recesses on the housing.

In an alternative design of the locking device, the lock can be arranged movably inside the housing perpendicular to the axis of the housing. In this case, the recess on the jacket of the housing is positioned approximately in the central region between the support posts which the spring-loaded lock engages in the locked position. Such a design also makes it possible to arrange the housing of the pivot mechanism recessed on the vehicle seat if a corresponding recess is provided on the top side of the backrest or on the component connected to the car body. This recess can advantageously be closed by a cover member provided with openings for the supports and the release knob.

Finally, the convenience of operation of the headrest can be further increased if the headrest can be released from the locked position by means of a driving mechanism acting on the lock or the activation button, e.g., a remote-controlled cable pull.

The invention permits numerous versions. By further illustration of its basic principle, some of them are shown in the drawing and described in the following.

DETAILED DESCRIPTION OF THE DRAWINGS

Figure 1:
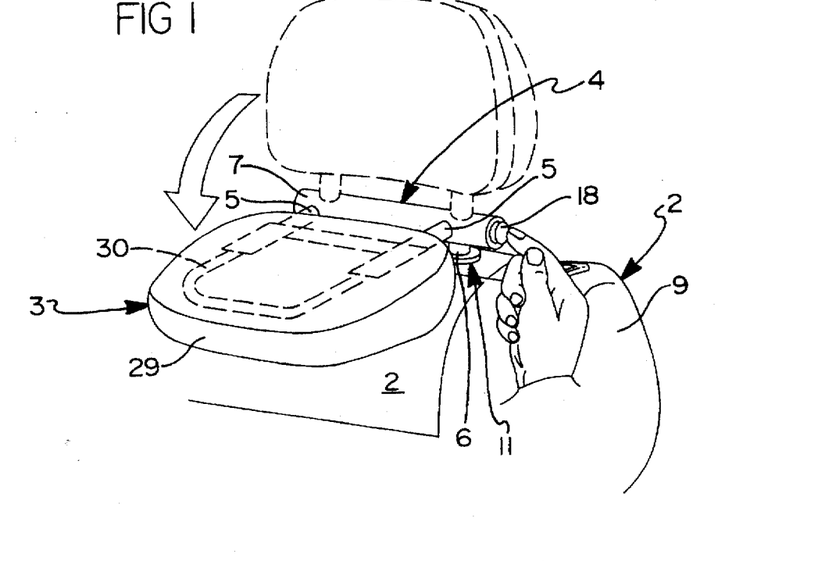
FIG. 1 is a perspective view of a headrest attached to a motor vehicle seat and folded forward.

FIG. 1 shows a headrest 3 ( in the rest position) which is attached to the backrest 9 of the motor vehicle 2 and is tilted about 90 degrees forward, which consists essentially of a supporting structure 10 and upholstery 29 enveloping it. To tilt the headrest 3, a pivot mechanism 4 is provided on the side of the headrest 3 which is connected by support brackets or rods 5 to the supporting structure 30. On the pivot mechanism 4, additional posts 6 are provided for the detachable attachment to the backrest 9. The headrest 3 can be moved into an approximately vertical position of use (indicated by broken lines) by the pivot mechanism 4 and in this position can be locked by means of the locking device located inside the pivot mechanism 4. To unlock and move the headrest 3 into the rest position, a release knob 18 arranged upon one side of the pivot mechanism 4 must be activated.

Figures 2, 3:
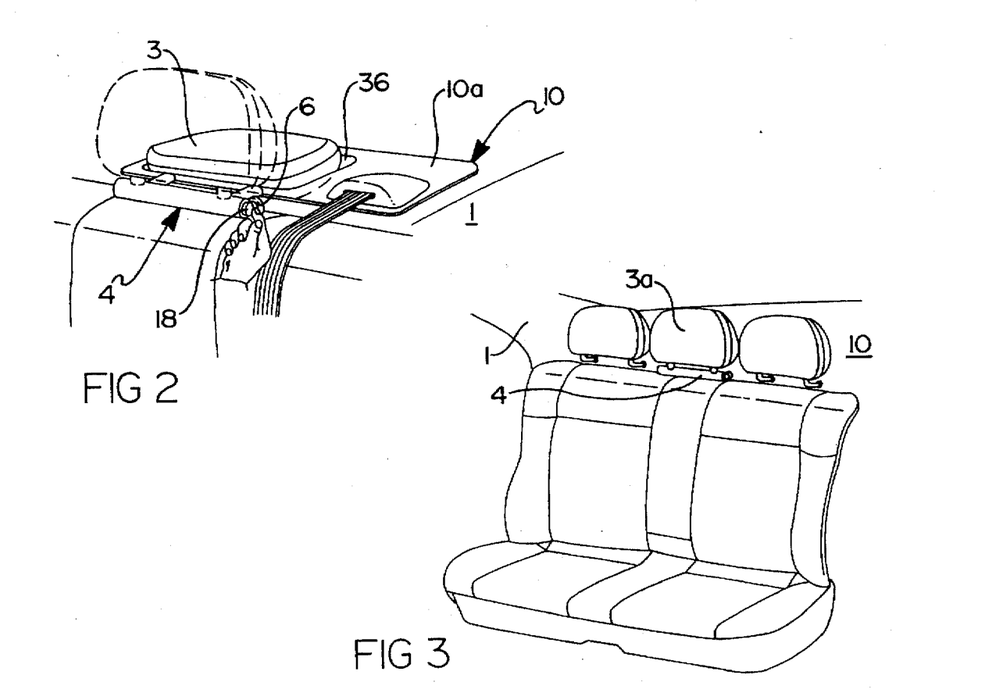
FIG. 2 is a perspective view of the headrest in FIG. 1 which is attached to a cargo space cover of the motor vehicle and is folded rearward.
FIG. 3 is a perspective view of a rear seat with the folding headrest in FIG. 2 which is designed as a center headrest.
Figure 4:
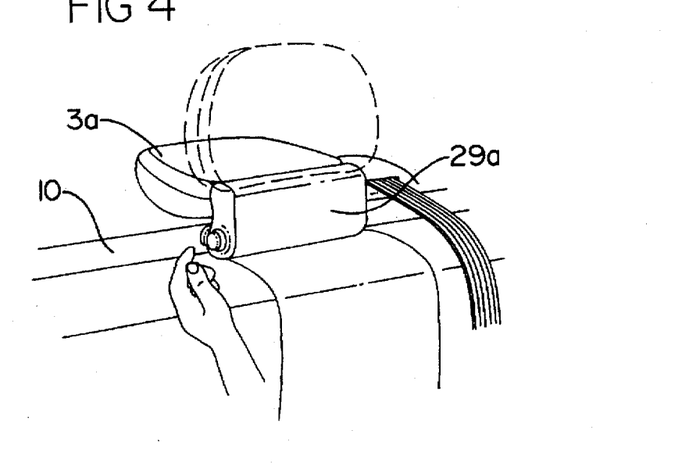
FIG. 4 is a perspective view of the center headrest in FIG. 3 in the position pivoted rearward and with a cushion in the region of the pivot mechanism.

As shown in FIG. 2, the headrest 3 can also be designed to be attached to a component 10 connected to the ear body 1, e.g., a cross member, not shown, of a cargo spaced cover 10a and adjustable rearward. In the example shown, the headrest 3 is detachably connected by posts 6 to the cross member. To improve vision to the rear, a recess 36 is provided on the cargo space cover 10a to hold the unlocked and rearward folded headrest 3. A headrest 3 of such a design can preferably be used as a center headrest 3a (FIG. 3) where in order to increase visibility and convenience, in addition, a cushion 29a is provided in the region of the pivot mechanism 4, as shown in FIG. 4.

Figure 5:
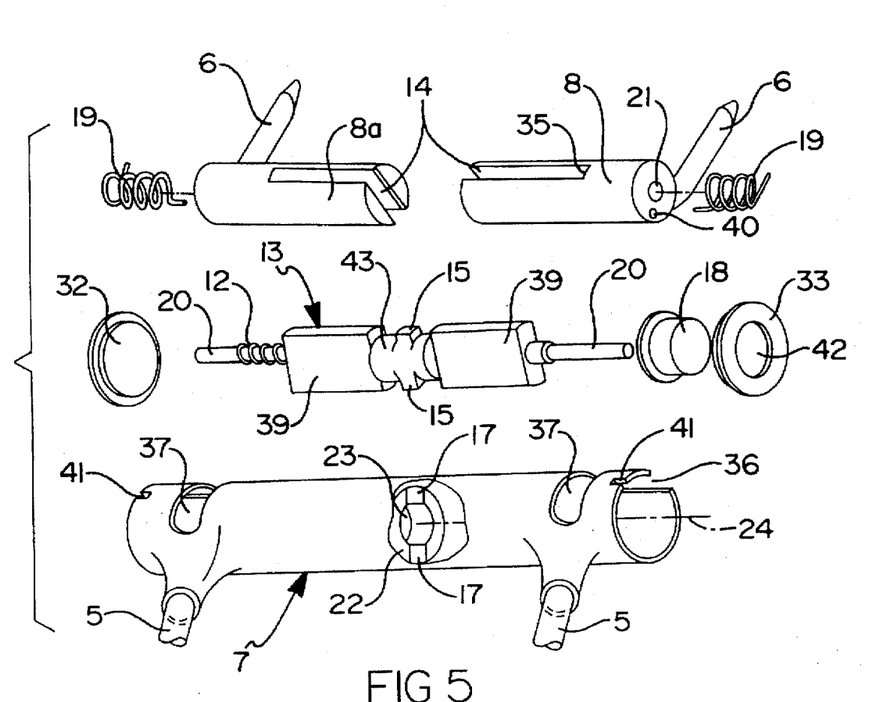
FIG. 5 is a design of the pivot mechanism shown in FIG. 1 in an exploded view.

FIG. 5 illustrates the structure of the pivot mechanism 4 shown in FIGS. 1 through 4 which consists essentially of a housing 7 and two journal pins 8, 8a rotatably mounted in it. For a detachable connection to the pivot mechanism 4 with the backrest 9, not shown, on the journal pins 8, 8a posts 6, and for connection with the, also not shown, supporting structure 30 on the housing 7 rods 5 are provided. The rods and posts 5, 6 are designed as conventional supporting rods which can engage or snap into sleeve-like guides 11 (FIG. 1) on the backrest 9. To install the journal pins 8, 8a in the housing 7, in each case a longitudinal slot 36 and a radial slot 37 are provided for the posts 6 on the jacket of the housing 7, the longitudinal slot 36 making insertion and the radial slot 37 rotatable mounting in the housing 7 possible.

The locking device arranged inside the pivot mechanism 4 consists essentially of the bolt 13 which is secured against rotation in groove-like guides 14 of the journal pins 8, 8a with its flattened regions 39 and displays in approximately the central region a segment 43 of circular cross section with radially projecting locking member lugs 15. This segment 43 is movably mounted for axial guidance of the bolt 13 in a boring 23 in the wall 22. Also for the movable mounting of the bolt 13, on its two ends axially directed guide pins 20 are provided which in the mounted state pass without play through borings 21 on the journal pins 8, 8a. A spring 12 arranged on a journal pin 8a and acting axially in this case, tensions the bolt 13 against a groove base 35 on the other journal pin 8. In this position, the locking member lugs 15 are in the stop member recesses 17 of the wall 22 on the housing 7 so that the journal pins 8, 8a are connected nonrotatably with the housing 7.

When the release knob 18, which acts on the guide pins 20, is activated, the bolt 13 is moved against the force of the spring 12 so that the locking lug member 15 is disengaged from the stop member recesses 17. The housing 7 and the headrest 3 connected to it can therefore be moved into the rest position.

For automatic folding of the headrest 3 into the rest position, two torsion springs 19 are arranged inside the homing 7 which are braced by spring force on the one hand on the journal pins 8, 8a and on the other in the homing 7. For this purpose, on the journal pins 8, 8a borings 40 and on the housing 7 slots 41 are provided in which the spiral springs 19 each engage the legs with their free ends. A lid 32 and a diaphragm 33 in this case close the housing 7 on the end, said diaphragm 33 having an opening 42 for the release knob 18.

Figure 6:
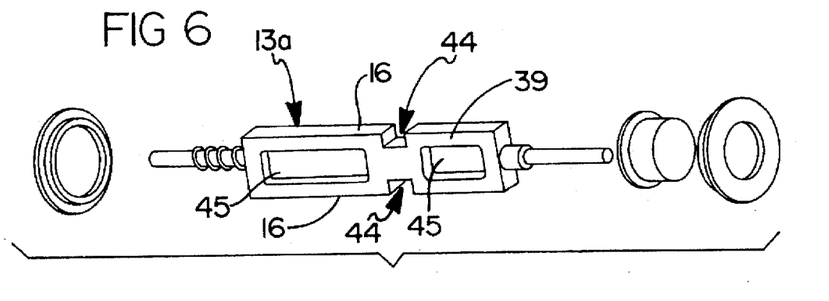
FIG. 6 is an alternative version of the lock in FIG. 5 in an exploded view.
Figure 7:
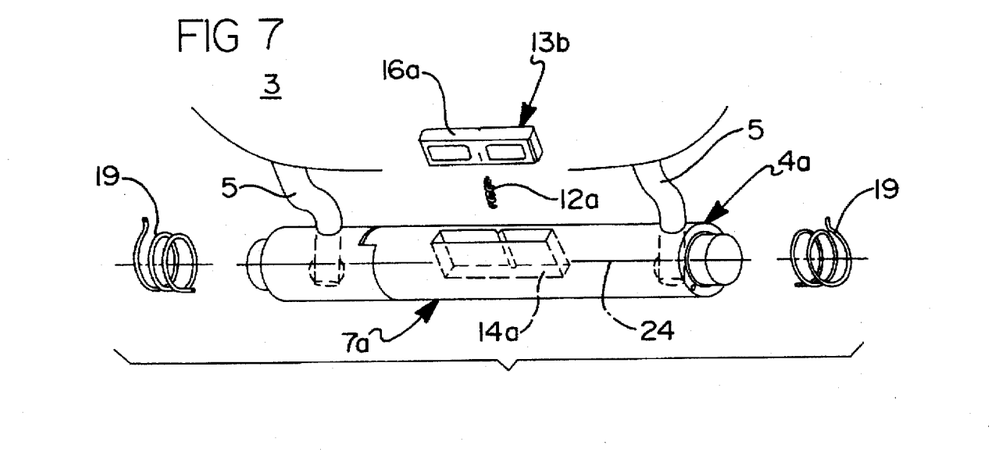
FIG. 7 and 8 are alternative designs of the pivot mechanism shown in FIG. 5.
Figure 8:
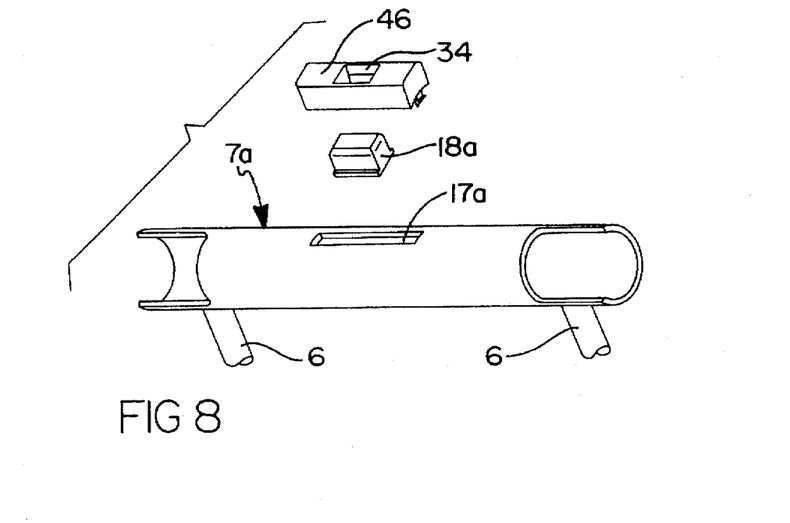

In FIG. 6, an alternative design of the bolt 13a is shown which differs from the version in FIG. 5 in the fact that the bolt 13a displays two recesses 44 approximately in the central region and adjacent to the recesses 44 two locking member edges 16, the function of the locking member edges 16 corresponds to the function of the locking lug 15 in the version of the bolt 13 shown in FIG. 5. To simplify production and reduce weight, the bolt 13a is designed with flattened regions 39 which extend over the entire width of the bolt 13a, and openings 45.

In the version of the pivot mechanism 4a shown in FIGS. 7 through 10, as opposed to the version previously described, the housing 7a, 7b is attached by posts 6 to the, not shown, backrest 9 and the journal pins 8b, 8c (FIG. 9) by rods 5 to the headrest 3. The journal pins 8b, 8c in this version are mounted rotatably in the housing 7a which is stationary relative to the backrest 9. The locking device arranged inside the pivot mechanism in this case consists essentially of a bolt 13b guided in a groove-like guide 14a on the journal pins 8b perpendicular to the axis 24 of the housing 7a which is tensioned in the locking position by the spring 12a acting in the radial direction. The bolt 13a in the locking device engages with its locking edge 16a a stop member recess 17a arranged on the jacket of the housing 7a and thus connects the housing 7 nonrotatably to the journal pin 8b.

Figure 10:
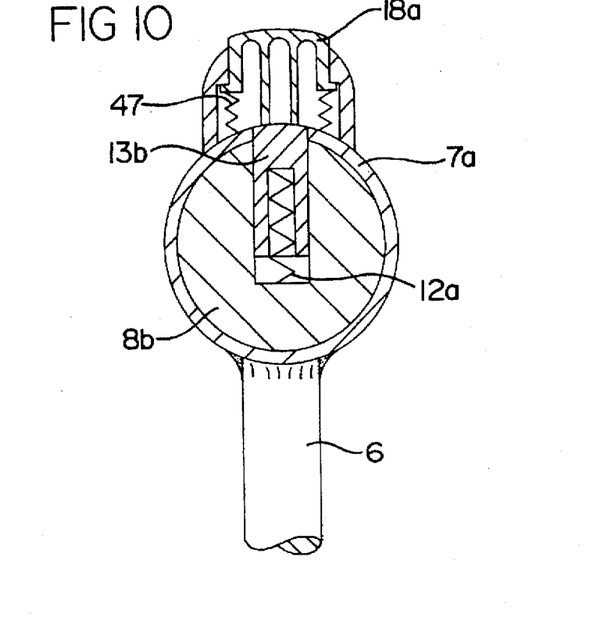
FIG. 10 is a cross section in the central region of the pivot mechanism in FIG. 7.

To unlock the journal pin 8b and therefore also the headrest 3, a release knob 18a is provided on the stop member recess 17a which is spring-loaded, and which can be activated radially inward toward the axis 24. For this purpose, a holding part 46 (FIG. 8) can be snap-locked onto recess 17a which displays a guide opening 34 for the release knob 18a. In this case, stops are provided on the release knob 18a and on the holding part 46 to limit the radial motion of the release knob 18a loaded by spring 47 (FIG. 10). The bolt 13b tensioned in the locking device against the holding part 46 and the release part 18a is capable of being moved by activation of the release knob 18a into the release position where the locking edge 16a is disengaged from the recess 17a.

Figure 9:
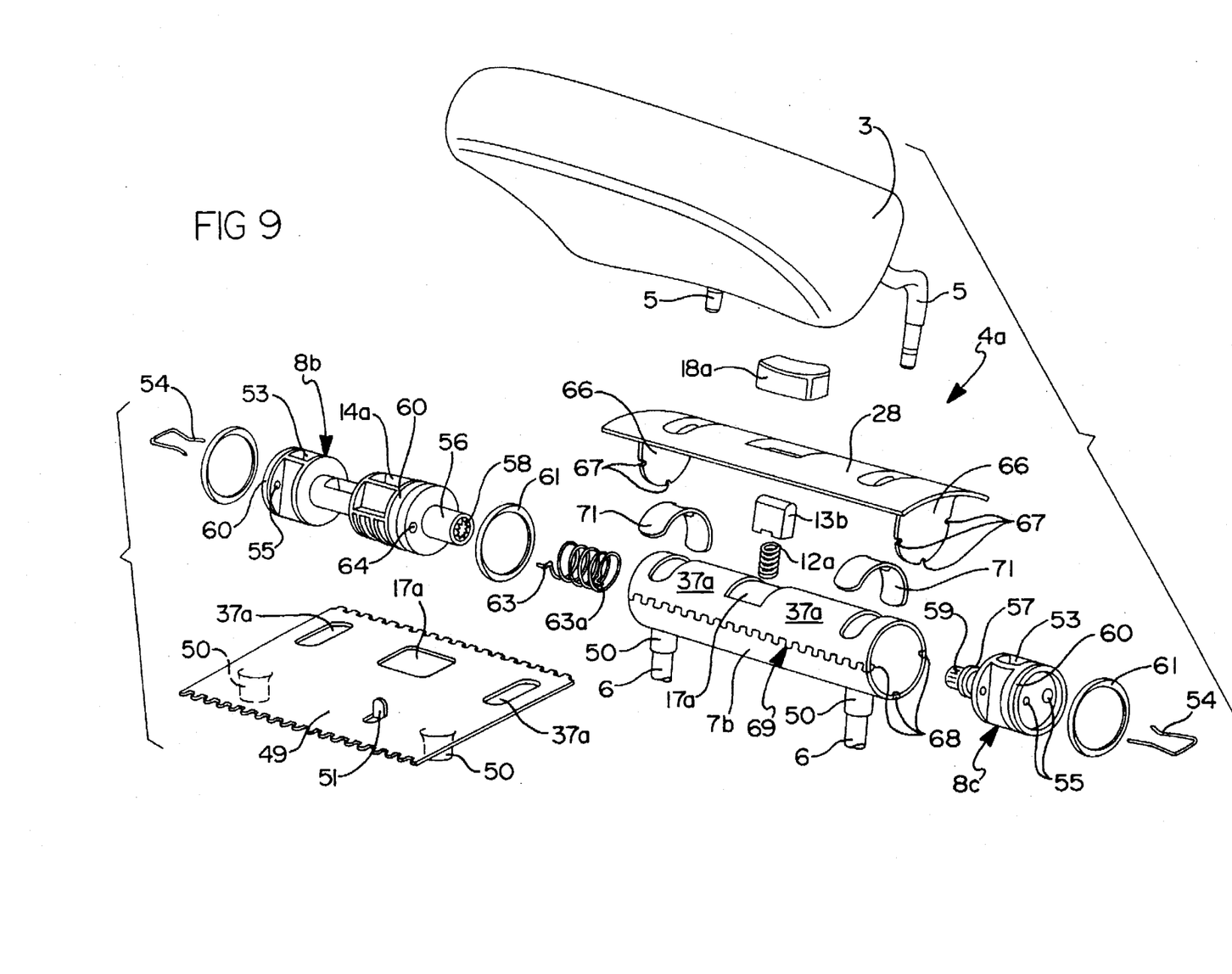
FIG. 9 is another version of the pivot mechanism in FIGS. 7 and 8 in an exploded view.

The housing 7b shown in FIG. 9 may be produced from a flat plate slab 49 in which slots 37a for the posts 5 and the recess 17a are prefabricated for the bolt 13b and passages 50 for connecting with the posts 6. The plate slab 49 is rolled into a tubular housing 7b with a form-fitting frictional connection in the region of the seam 69, seam 69 being closed by clip hooks. In the housing 7b, two journal pins 8b, 8c made of plastic and torsionally connected to one another are rotatably mounted and display radial openings 53 for connection with the posts 5. The posts 5 are held in openings 53 by means of a snap locking spring 54 which collaborates with a snap-in groove 70 provided on the support 5. The snap locking springs 54 are attached in axial borings 55 on the journal pins 8b, 8e.

An inner toothing 58 is provided in the region of a peg 56 for the form-fitting connection of the two journal pins 8b, 8c on the journal pin 8b which interacts with an external toothing 59 arranged on a peg 57 of the journal pin 8c. Between the two journal pins 8b, 8c for automatic switching of the headrest 3 into the rest position, in the region of the pegs 56, 57 a torsional spring 61 is arranged which is braced with one end 63 in a recess 64 on the journal pin 8b and with the other end 63a on a stop 51 on the housing 7b (shown on the plate slab 49). The radial play between the journal pins 8b, 8c and the housing 7b in this case is compensated by elastic plastic or rubber rings 61 acting simultaneously as shock absorbing elements which are held in the circular grooves 60.

Figure 11:
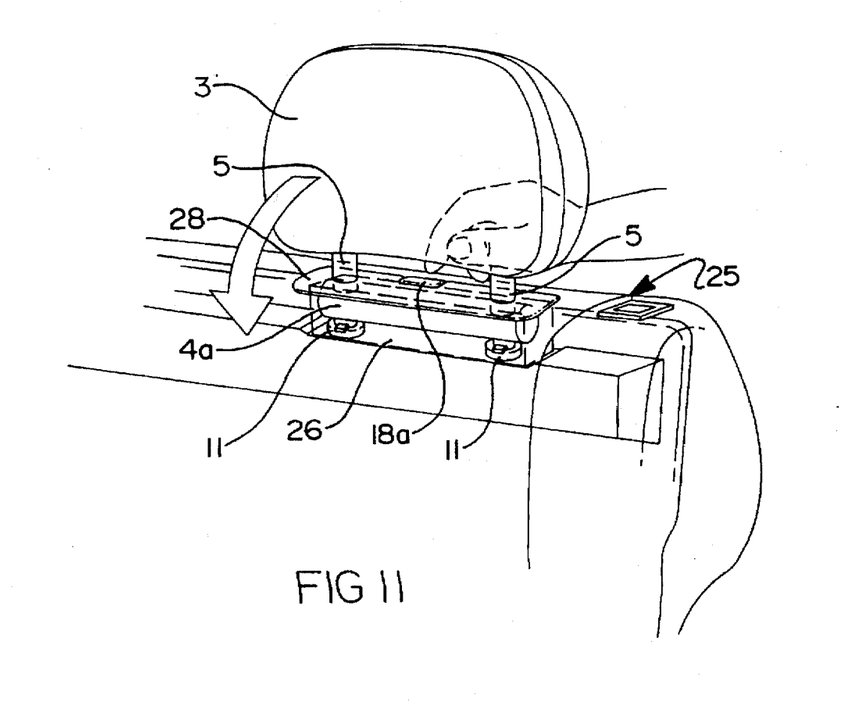
FIGS. 11 through 13 are an arrangement of the headrest with a pivot mechanism recessed on the backrest as in FIGS. 7 through 10 in perspective view.
Figure 12:
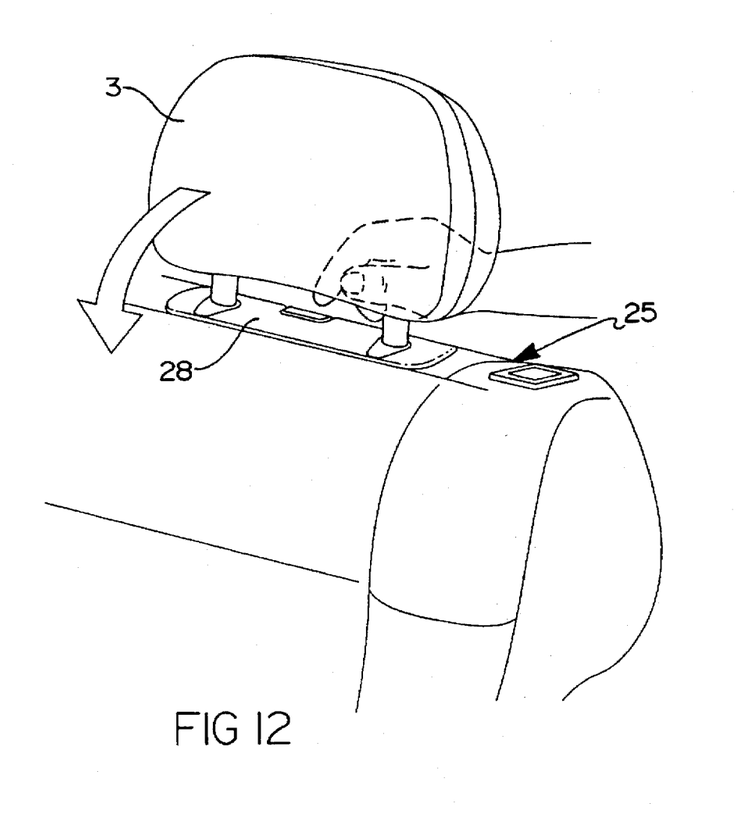
Figure 13:
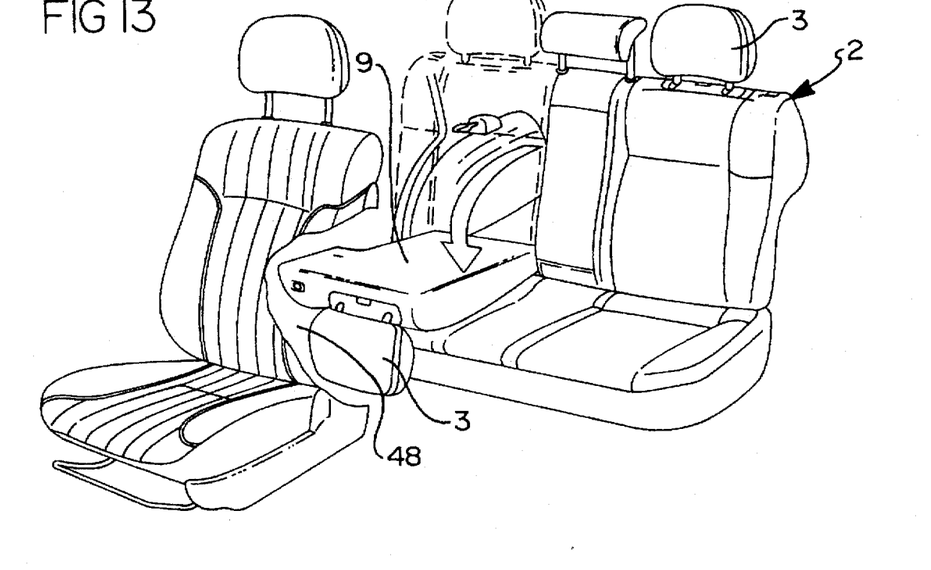

Because of its advantageous design, the pivot mechanism 4a can be arranged recessed in a recess 26 on the motor vehicle 2 as shown in FIGS. 11, 12 and 13. In particular, FIG. 11 shows the arrangement of the pivot mechanism 4a on the backrest 9 where the pivot mechanism 4a together with the support brackets 6 is attached in the recess 26 below the top side 25 of the backrest 9 in the sleeve-like guides 11. The recess 26 in this case is covered by a cover member 28 which has openings for the posts 5 and the release knob 18a. The cover member 28 as shown in FIG. 9 is formed with Side plates 66 projecting vertically which close the end faces of the housing 7b in the attached state. To attach the cover member 28 on the side plates 66 symmetrically arranged snapping recesses 67 are provided which snap together with the cross bars 68 arranged on the end faces of the housing 7b.

Also on the pivot mechanism 4a between the cover member 28 and the housing 7b on the surface of the housing 7b movable covering diaphragms 71 are provided which in each case display symmetrically arranged openings for the posts 5 and cover the slots 37a in each position of the headrest 3.

As FIG. 13 shows, such a headrest 3 is especially suitable for the rear seat of a motor vehicle where the headrest 3 can be installed on the forward-folded backrest 9 in the space 48 between the seat rows.

What is claimed is:

1. In a motor vehicle seat having a backrest and a headrest having a supporting structure, a pivot mechanism for supporting said headrest to said backrest so that said headrest is pivotable forward and rearward relative to said backrest about a substantially horizontal axis lying in the transverse direction of the vehicle, and so that said headrest can be releasably locked in a substantially vertical position, said pivot mechanism comprising:

a sleeve-like housing located outside of said headrest and having a post connected to said headrest supporting structure, said housing also having a radial slot and an internal stop member recess, a journal rotatably mounted within said sleeve, said journal having a central axis and a post connected to said backrest to orient said journal axis substantially horizontal and in the transverse direction of said vehicle seat said journal post also being movable within said sleeve radial slot as said journal rotates within said sleeve, said journal further having a groove like guide and a central boring through an end of said journal that opens into said groove like guide, a bolt which is arranged within said housing and slidable within said groove like guide against the force of a spring, said bolt further having a guide pin guided without play through said journal central boring and also having a locking member engageable in form locking relationship with said sleeve internal stop member recess to hold said sleeve post, headrest supporting structure and headrest in said substantially vertical position, and, a release button movable relative to said sleeve to push said bolt guide pin through said journal central boring against the force of said spring to thereby slide said bolt through said journal groove like guide to a released position that removes said bolt locking member out of form locking relationship with said sleeve internal stop member recess, and thereby releases said sleeve to allow relation of said journal as said journal post moves through said sleeve radial slot and said headrest concurrently rotates about said journal axis.

* * * * *